(No Model.)
W. C. JAMES.
SCALE BEAM FOR WEIGHING SCALES.
No. 463,195. Patented Nov. 17, 1891.
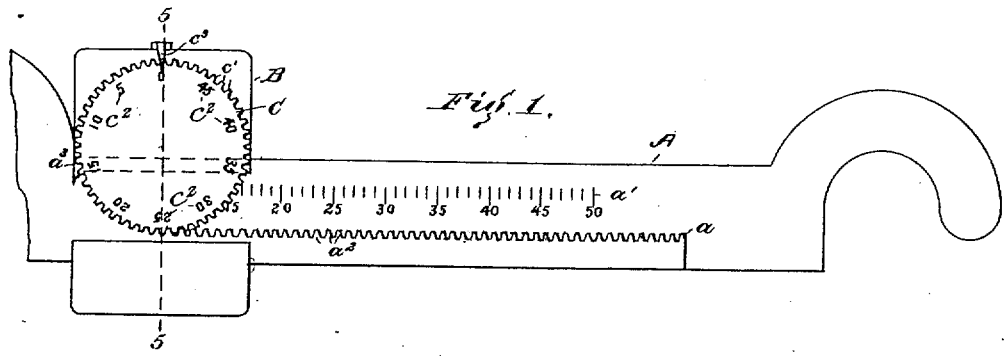
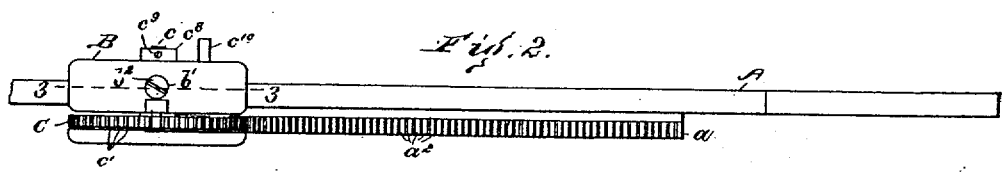
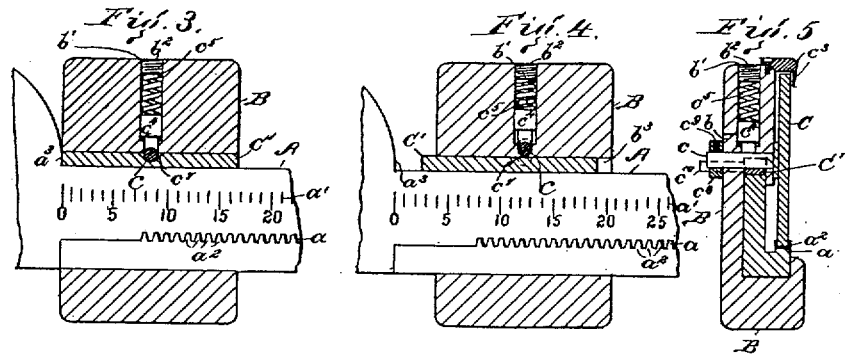
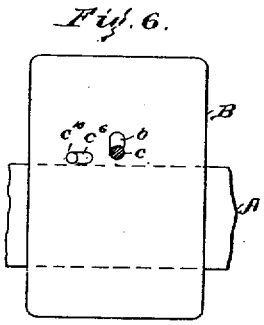
Witnesses
Kirkley Hyde.
Myrtie C. Beale.
Inventor
Willard C. James,
By Albert M. Moore,
His Attorney.

UNITED STATES PATENT OFFICE.

WILLARD C. JAMES, OF BOSTON, MASSACHUSETTS.

SCALE-BEAM FOR WEIGHING-SCALES.

SPECIFICATION forming part of Letters Patent No. 463,195, dated November 17, 1891.

Application filed February 2, 1889. Serial No. 298,508. (No model.)

*To all whom it may concern:*

Be it known that I, WILLARD C. JAMES, a citizen of the United States, residing at Boston, in the county of Suffolk and Commonwealth of Massachusetts, have invented a certain new and useful Improvement in Scale-Beams for Weighing-Scales, of which the following is a specification.

My invention relates to scale-beams for weighing-scales; and it consists in means, hereinafter described, whereby the weight of separate additions to the load will be separately indicated, while the total weight of the load is also indicated by the usual means.

In the accompanying drawings, Figure 1 is a front elevation of a scale-beam and sliding weight with my improvement, the end of the beam nearest the fulcrum being omitted; Fig. 2, a plan of the parts shown in Fig. 1; Fig 3, a front elevation of a part of the scale-beam and a vertical section of the sliding weight and incline or wedge on the line 3 3 in Fig. 2; Fig. 4, a section similar to Fig. 3, except that the sliding weight is moved farther from the 0-graduation mark on the scale, and that the incline or wedge is in a position to raise the indicating-gear out of engagement with the rack, while in Fig. 3 the incline is in a position to allow the indicating-gear to be in engagement with said rack and the sliding weight is in its 0 position; Fig. 5, a vertical section on the line 5 5 in Fig. 1; Fig. 6, a rear elevation of the sliding weight and of a portion of the scale-beam.

A represents such a scale-beam as is used in counter-scales, platform-scales, and other weighing-scales where a weight sliding on the scale-beam is used to balance the load by moving it farther from the fulcrum of said beam as the load is greater, except that the scale-beam shown is provided with a rack $a$, rigidly secured to said scale-beam parallel therewith.

The beam A is provided with the usual graduations $a'$, denoting the number of pounds or other measures of weight and fractions of such measures, and is used in connection with other parts commonly found in such scales, but not shown herein, because forming no part of my invention.

The sliding weight B slides on the scale-beam in the usual manner to balance the load, the inner (or left side in Fig. 1) vertical side of the weight serving as an index-finger to point to the graduations on said beam. An indicating-gear or toothed indicating-wheel C is secured to an arbor $c$, which extends through a slot $b$, reaching through said weight from front to back of the same, said arbor turning freely in said slot and carrying a collar $c^8$, held by a set-screw $c^9$, which turns radially in said collar and thrusts against said arbor, said collar resting against the back of the weight B and holding the wheel C against the front of said weight and in the same vertical plane with said rack $a$. The teeth $c'$ of the wheel C are normally held in engagement with the teeth $a^2$ of said rack by means of a follower $c^4$, which presses upon the top of the arbor $c$, being itself pressed upon by a spring $c^5$, said follower and spring being contained and guided in a vertical hole $b'$ in the top of said weight B and retained therein by a screw $b^2$, which turns in the upper threaded part of said hole $b'$ and compresses said spring $c^5$, said spring yielding sufficiently to allow the wheel C to be raised, when desired, out of engagement with said rack, the slot $b$ having a sufficient vertical length to allow this to be done. A wedge-bar C' passes through said weight B from side to side thereof in the slot $b^3$, which receives the beam A, and rests upon the top of said beam, the length of said wedge-bar being equal to the transverse thickness of said weight. A stud $c^{10}$ projects from said wedge-bar C' through a transverse slot $c^6$, which reaches from said slot $b^3$ through the back of said weight, by which stud the wedge-bar may be moved to the left in Figs. 1 and 4, causing its inclined part $c^7$ to run under the arbor $c$ and raise the wheel C out of engagement with said rack, and when this is done the wheel C may be turned to bring any of its indicating-figures behind the pointer $c^3$. When the weight B is moved back to the 0-mark of the scale $a'$, the end of the wedge-bar C' strikes against the shoulder or stop $a^3$, and is thereby driven back into the weight, thus allowing the wheel C to be thrown by the springs $c^5$ into engagement with the rack.

The effective part of the rack $a$ may be of the same length as the scale of graduations, but is represented as somewhat longer than said scale to insure the better engagement of said rack and the wheel C, and the wheel makes one revolution when the sliding weight is moved from the highest to the lowest graduation of the scale. The wheel C is graduated at equal intervals at or near its periphery, as shown at $c^2$, with graduations equal in number to the graduations $a'$, the 0-mark on said wheel indicating not only 0, but a number equal to the greatest number on the scale $a'$. When there is no load on the platform or pan of the weighing-scale and the sliding weight B is at the 0-point, the 0-mark on the wheel C will be at the top of the wheel immediately behind a pointer $c^3$, secured to said weight and reaching over the top of said wheel.

When the weight B is moved along on the scale $a'$ from 0 to any number—for instance, 15—the wheel C will be rotated, owing to its engagement with the rack $a$, a corresponding amount—that is, in this case, until the pointer $c^3$ indicates 15. As additions are made to the load, the indications on the scale $a'$ will be increased in the usual manner to indicate the total weight of the load; but the wheel C, after each increment to the load is indicated thereon, may be raised out of engagement with said rack $a$, as above stated, and turned back by hand until the 0-mark on said wheel is indicated by the pointer $c^3$. If this is done, the weight of the entire load can always be learned from the scale $a'$ and the weight of the last addition to said load from the wheel C. When the addition to the load is greater than the difference between the last indication on the scale $a'$ and the highest graduation on said scale, and it becomes necessary to add a weight to the weight-pan at the free end of the beam, the wheel C should be set to indicate the amount of this difference, and the weight B should be moved back to the 0-mark before said wheel is again thrown into engagement with the rack. Thus if the last indication on the scale $a'$ is 98 and the highest graduation-mark on said scale $a'$ is 100, the wheel C should indicate 2 when the weight B is at the 0-mark, and if on moving said weight to the mark 7 on said scale $a'$ the load is balanced the wheel C will correctly indicate 9 as the weight of the last addition to the load.

Instead of a stationary pointer and a rotating dial, a rotating pointer and a stationary dial may be used.

I claim as my invention—

1. The combination of the scale-beam provided with a rack and with a graduated and numbered scale, a weight sliding on said beam and having a vertical slot, and a toothed wheel engaging said rack and having an arbor arranged in said slot, said wheel having numbered graduations corresponding to the graduations of said scale, said slot being long enough to allow said wheel to be raised out of engagement with said rack and to be turned without moving said weight, as and for the purpose specified.

2. The combination of the scale-beam provided with a rack and with a graduated and numbered scale, a weight sliding on said beam and having a vertical slot, and a toothed wheel engaging said rack and having an arbor arranged in said slot, said wheel having numbered graduations corresponding to the graduations of said scale, said slot being long enough to allow said wheel to be raised out of engagement with said rack and turned without moving said weight, and a spring arranged in a hole with which said weight is provided and pressing upon said arbor to hold said wheel in engagement with said rack, as and for the purpose specified.

3. The combination of the scale-beam provided with a rack and with a graduated and numbered scale, a weight sliding on said beam and having a vertical slot, a toothed wheel engaging said rack and having an arbor arranged in said slot, said wheel having numbered graduations corresponding to the graduations of said scale, said slot being long enough to allow said wheel to be raised out of engagement with said rack and to be turned without moving said weight, and a wedge-bar arranged to slide upon said beam within said weight and having an incline adapted when said bar is moved endwise to raise said arbor and to lift said wheel out of engagement with said rack, as and for the purpose specified.

4. The combination of the scale-beam provided with a rack and with a graduated and numbered scale, a weight sliding on said beam and having a vertical slot, a toothed wheel engaging said rack and having an arbor arranged in said slot, said wheel having numbered graduations corresponding to the graduations of said scale, said slot being long enough to allow said wheel to be raised out of engagement with said rack and to be turned without moving said weight, and a wedge-bar arranged to slide upon said beam within said weight and having an incline, and a stud secured to said wedge-bar and projecting through another slot with which said weight is provided, to enable said wedge-bar to be moved endwise to raise said arbor and to lift said wheel out of engagement with said rack, as and for the purpose specified.

5. The combination of the scale-beam provided with a shoulder or stop and with a rack, a weight sliding on said beam and having a vertical slot, a toothed wheel engaging said rack and having an arbor arranged in said slot, said slot being long enough to allow said wheel to be raised out of engagement with said rack, a wedge-bar arranged to slide upon said beam within said weight and having an incline adapted when said bar is moved endwise in one direction in said weight to raise said arbor and to lift said wheel out of engagement with said rack, said wedge-bar being adapted when said weight is moved to its 0 position to strike said shoulder or stop and to allow said wheel to fall into engagement with said rack, as and for the purpose specified.

In witness whereof I have signed this specification, in the presence of two attesting witnesses, this 28th day of January, A. D. 1889.

WILLARD C. JAMES.

Witnesses:
ALBERT M. MOORE,
MYRTIE C. BEALS.